Patented Feb. 20, 1940

2,190,776

UNITED STATES PATENT OFFICE 2,190,776

COMPOSITION OF MATTER

Ellsworth K. Ellingboe and Paul L. Salzberg, Wilmington, Del., assignors to E. I. du Pont de Nemours & Company, Wilmington, Del., a corporation of Delaware No Drawing. Application January 27, 1937, Serial No. 122,661

10 Claims. (Cl. 260—42)

This invention relates to compositions of matter and more particularly to organic coating and plastic compositions that are resistant for long periods of time to deterioration caused by heat and light.

It is well-recognized that films laid down from coating compositions having therein any appreciable amount of an organic halogen-containing material are subject to more or less deterioration on exposure to heat and light. This deterioration is evidenced by the darkening of the film and its failure to protect the surface over which it is applied, particularly if that surface is a metal. This disintegration and darkening of the film and frequent rusting of metal surfaces is observed whenever the halogen-containing substance in the coating composition is sufficiently non-volatile to remain in the film, i. e., whether it be a halogenated plasticizer, wax, resin, or rubber-like material. This is recognized by those skilled in the coating art as the principal reason why halogen-containing film systems have not met with any great commercial success. As specific illustrations of plasticizers, resins, and rubbers which are particularly subjective to deterioration, there may be mentioned, respectively, the chloroacetates of various polyhydric alcohols, polymeric vinyl chloride, and chlorinated rubber.

It is probable that the impermanent character of halogen-containing film systems is due to the very slow but continued evolution of hydrohalide or other halogen acid, and this supposition has led to many proposals in the prior art to include basic or alkaline-reacting materials, both organic and inorganic, in the coating composition formula. However, such expedients, while moderately successful in some instances, are in general unsatisfactory. The organic bases which have been suggested for the purpose, such as amines, have all been low molecular weight, monomeric, or non-film-forming compounds which, because of their volatility, do not remain in the film for any appreciable period of time. Inorganic alkalis, while they remain in the film, are not wholly satisfactory because they are as a rule incompatible with the remaining ingredients of the coating composition and insoluble in the organic solvents from which the film is generally laid down.

The primary object of the present invention, therefore, is the provision of a material or class of materials which, when incorporated into coating or plastic compositions having a substantially non-volatile halogen-containing ingredient therein, will impart to such composition a more permanent resistance to deterioration by heat, light, and other influences. A more general object is the provision of new coating and plastic compositions. Other objects will appear as the description proceeds.

The above and other objects appearing hereinafter are accomplished by the following invention wherein an organic halogen-containing substantially non-volatile material, and more particularly a coating or plastic composition based on or containing such a material, is compounded with a non-volatile film-forming polymeric basic amino-nitrogen-containing substance soluble in organic solvents. By "film-forming" is meant the capability of being formed into a coherent, solid film, dry to the touch.

So far as is known, no organic polymeric basic material of this type has been suggested before for such a purpose. In addition to arresting the deterioration of the halogen-containing film system for longer periods of time than low molecular weight organic bases, amino polymers of the above class have the additional advantage of adding to the film-forming or plastic characteristics of the composition in question. Some discussion of the meaning and significance of the above restrictions on the preservation agent are desirable. The term "polymeric" implies an amorphous, high molecular weight substance usually capable of being formed into a coherent film; that the agent be polymeric, non-volatile and film-forming is necessary if it is to be retained in the film for any appreciable time and if it is not to detract from the film-forming ability of the composition. By "basic" is meant an ability to form acid addition salts, and by "amino-nitrogen" is meant the nitrogen of an amino group as opposed to that of nitro, amido, nitrile, etc., groups. It is a matter of simple test to determine if the agent is basic in character and contains amino-nitrogen. In the large majority of cases, the materials from which the agent is synthesized are a definite indication whether or not it contains amino-nitrogen. It is sufficiently basic if it dissolves readily in dilute aqueous acetic acid. The qualification "organic-solvent-soluble" implies simple physical solution (i. e., without chemical reaction) to an appreciable extent in one or more types of solvents such as alcohols, hydrocarbons, ketones, esters, etc. Thus, methylaminophenol-formaldehyde resin, which is readily soluble in a number of solvents, is suitable for use in the invention, whereas deacetylated chitin is not because it is insoluble in organic solvents.

Certain of the chemical and physical properties set forth as necessary in the amino polymers are implied to a greater or less degree from other requisites that are named, but each property has a definite connotation of its own and all are necessary to set forth accurately the type of polymer required. Thus, an amino-nitrogen-containing material is not always basic, and vice versa. Similarly, a polymeric material may or may not be film-forming, and vice versa.

In general, to one skilled in the art, the various qualifications placed on the agent are definite in meaning and, whether or not a given substance possesses them, is a matter of simple test. In the investigation leading to this invention, materials of widely different chemical types, but having in common the properties set forth as necessary, were tested and all of them without exception were found to give the desired result to at least some degree. So far as is known, therefore, any material which has these properties is suited for use in the invention but only if it possesses all of them.

A unique distinction in the behavior of the present amino polymers after incorporation into the film, as compared to the behavior of low molecular weight organic bases, is that the former have a much less pronounced tendency to be leached by water from the film, especially during its early life before it has become thoroughly hardened and before the acids of decomposition have begun to be evolved. This is believed to be due to the larger and bulkier nature of the molecule of amino polymer (or salt thereof with the acids of decomposition), but, whatever the explanation, the difference is a very significant and valuable one. The leaching out of any film ingredient often damages the physical structure of the film to such an extent that it gives little or no protection to the underlying surface. Further, if the amino polymer is to remain in the film and function, it should be capable of resisting this leaching action of water in addition to being non-volatile. In a word, the net result is improved water resistance and prevention of deterioration for a longer period of time in the case of the amino polymers.

The following examples, which are not to be construed as limitative, illustrate the more detailed practice of the invention and make evident some of its advantages. The various amino polymers used in these examples all have the physical and chemical characteristics previously set forth as necessary. Parts given are by weight unless otherwise stated.

Example I

To a 20% solution in toluene of chlorinated rubber of approximately 66% chlorine content and neutral to bromthymol blue was added 20%, based on the weight of chlorinated rubber, of a resin prepared from 94 parts of phenol, 150 parts of 40% formaldehyde and 31 parts of methylamine as described by Harmon and Meigs in application Serial No. 85,820, filed June 17, 1936. This composition is suitable for the preparation of transparent films and coatings of all kinds by solvent evaporation. It may be applied to metal, concrete, paper, leather, and the like. The coatings are resistant to deterioration by light and heat. Thus when copper strips were coated with this composition, dried, and exposed to ultra-violet light from a mercury arc lamp at a distance of about 18 inches, they showed practically no discoloration after 24 hours exposure. Copper strips which had been coated with solutions of the same chlorinated rubber but containing no amine resin became very dark colored during 2 hours exposure to ultra-violet light under the same conditions.

Example II

To a 20% solution in toluene of the chlorinated rubber specified in Example I was added 20%, based on the weight of chlorinated rubber, of a resin prepared from 94 parts of phenol, 143 parts of 40% aqueous formaldehyde and 23 parts of dimethylamine. Copper strips which had been coated with this composition showed only a very slight discoloration when exposed to ultra-violet light for a period of 25 hours under the conditions given in Example I.

Example III

Twenty (20) parts of chlorinated rubber of the type specified in Example I and 2 parts of polymeric beta-dicyclohexylaminoethyl alpha-methacrylate (prepared according to Example 3 of Harmon, Serial No. 21,810, filed May 16, 1935) were dissolved in 80 parts of toluene. When tested in the manner indicated in Example I on copper strips, the coatings prepared from this composition showed only a slight discoloration after 25 hours exposure to ultra-violet light.

Example IV

To a 20% chloroform solution of the chlorinated rubber specified in Example I was added 20%, based on the weight of the chlorinated rubber, of a polymeric material containing 3.4% of basic nitrogen and prepared by ester interchange between diethylaminoethanol and methylmethacrylate polymer as described in Example XI of Graves Serial No. 21,807, filed May 16, 1935. When copper strips which had been coated with this composition were exposed to the action of ultra-violet light under the conditions indicated in Example I, they showed only a very slight discoloration after 10 hours exposure. Even after 25 hours, the discoloration was not serious.

Example V

To a 20% solution in chloroform of the chlorinated rubber described in Example I was added 10%, based on the weight of the chlorinated rubber, of a polymeric material prepared by the reaction of ammonia with an interpolymer of 41 mol percent of methyl methacrylate monomer and 59 mol percent of methyl vinyl ketone monomer, the exact method of preparation being given in Example XIII of Balthis Serial No. 69,725, filed March 19, 1936. When tested in the manner described in Example I, copper strips which had been coated with this composition showed only very slight discoloration after 5 hours exposure to ultra-violet light.

Example VI

To a 20% solution of polyvinyl chloride (polymerized vinyl chloride) in butyl acetate was added 10%, based on the weight of the polyvinyl chloride, of the phenol-formaldehyde-dimethylamine resin specified in Example II. This composition yielded clear films, coatings, sheets, etc. Copper strips coated with this composition and exposed to ultra-violet light under the conditions given in Example I showed only a very slight darkening after 24 hours whereas strips which had been coated with a 20% solution of the same polyvinyl chloride containing no modifying agent showed definite discoloration after 2 hours and were very badly discolored after 5 hours. Equally or even more significant results were obtained when any of the phenol-formaldehyde-primary amine resins of Harmon and Meigs, Serial No. 85,820, were substituted for the phenol-formaldehyde-dimethylamine resin.

Example VII

To a 20% solution in butyl acetate of polyvinyl chloride (which may be of any viscosity and prepared by any common method) was added 15%, based on the weight of the polyvinyl chloride, of polymeric beta-diethylaminoethyl alpha-methacrylate prepared according to Example II of Harmon Serial No. 21,810. Copper strips coated with this composition, dried, and exposed to the action of ultra-violet light showed almost no discoloration after 25 hours exposure. Equally significant results were obtained when the diethylaminoethyl methacrylate resin was replaced by any of the other aminoalkyl methacrylate polymers disclosed in Serial No. 21,810, and when the polyvinyl chloride was replaced by vinyl chloroacetate polymers, interpolymers of vinyl chloride with vinyl acetate or with other vinyl compounds such as styrene or vinyl chloroacetate, or with interpolymers of vinyl chloride or vinyl chloroacetate with methyl methacrylate. An example of a specific interpolymer which was used with good results is that obtained by polymerizing a mixture of 87 parts of vinyl chloride and 13 parts of vinyl acetate in the presence of a catalyst such as hydrogen peroxide or benzoyl peroxide, and with or without the addition of a solvent such as toluene.

Example VIII

To a 25% solution in toluene of the ether resin obtained by the reaction of bis(4-hydroxy-3,5-dichlorophenyl)dimethylmethane with sodium hydroxide and $\beta,\beta'$-dichlorodiethyl ether according to Example VI of Arvin U. S. P. 2,060,715 was added 10%, based on the weight of the ether resin, of the phenol-formaldehydedimethylamine resin specified in Example II. This composition may be used for the preparation of films and coatings which are resistant to deterioration by light and heat. Thus copper strips which had been coated with the above composition showed no discoloration after 25 hours exposure to ultra-violet light under the conditions indicated in Example I. Sheets coated with the same resin but containing no modifying agent showed definite discoloration at the end of 10 hours exposure to ultra-violet light.

Polymeric basic amino-nitrogen-containing materials may also be used in compositions containing halogenated waxes, particularly the chlorinated paraffins, naphthalenes, and diphenyls, to improve their resistance to deterioration by heat and light. For example, the basic amino-nitrogen-containing polymers specified in Examples I and II are especially effective for the stabilization of chlorinated naphthalenes ("Halowaxes") and chlorinated diphenyls ("Arochlors") when used in amounts of about 10 to 15% based on the weight of the chlorinated material.

The basic amino-nitrogen-containing polymers are also effective in preventing the deterioration of films laid down from compositions having therein chlorine-containing plasticizers. About 10% of the amino polymer, based on the weight of the halogenated plasticizer, is a satisfactory amount to use. This modification of the invention is illustrated by the following example:

Example IX

The following materials were dissolved in 30 parts of acetone.

| | Parts |
|---|---|
| Acetone-soluble cellulose acetate | 5 |
| Ethylene chloroacetate (B. P. 149–151° C./10 mm.) | 2 |
| Toluene | 2 |
| Basic amino-nitrogen-containing resin | 0.2 |

Films, coatings, and sheets prepared from compositions of this type are highly resistant to discoloration and embrittlement by the action of light and heat. Thus copper strips coated therewith, dried, and exposed to the action of ultra-violet light under the conditions indicated in Example I resisted discoloration as indicated in the following table.

| Amine resin | Darkening of copper panel in ultra-violet light after— | | |
|---|---|---|---|
| | 2 hrs. | 5 hrs. | 25 hrs. |
| None (control) | Amber | Dark brown | Black. |
| Polymeric diethylaminoethyl methacrylate | None | Amber | Brown. |
| Phenol-formaldehyde-dimethlamine resin | do | None | None. |

The basic amino-nitrogen containing polymers are, as has been stated, also effective in preventing the deterioration from heat of organic halogen-containing coating and plastic compositions. This is illustrated in the following example:

Example X

Twenty (20) parts of a finely pulverized interpolymer of vinyl chloride and vinyl acetate, prepared by the interpolymerization of 87 parts of vinyl chloride and 13 parts of vinyl acetate under pressure at about 100° C. and in the presence of 3% benzoyl peroxide, were ground with 20 parts of a 20% solution of polymeric beta-diethyl-aminoethyl alpha-methacrylate in a solvent mixture composed of 90% methanol and 10% water. When the methanol and water had evaporated, the finely ground mixture was molded at 135° C. under a pressure of about 2,000 lbs. per sq. in. for 7 minutes. The molded article showed considerably less discoloration due to the molding operation than a similar article molded from the unmodified interpolymer under the same conditions.

Even better results may be obtained when the amino-nitrogen-containing polymer is incorporated more intimately with the organic halogen-containing material. Thus, when the above composition is prepared by dissolving the components in a mutual solvent such as acetone and the solvent evaporated, the resulting mixture may be molded under the conditions given above with the formation of chips which show substantially no discoloration.

In general, in the practice of this invention, any organic-solvent-soluble basic amino-nitrogen-containing polymer may be used for the preparation of light and heat resistant compositions comprising organic halogen-containing materials. The basic amino-nitrogen-containing polymer should also be compatible, at least to some extent, with the organic halogen-containing substance, and it should not as a rule be used in an amount greater than that in which it is compatible. The amount of polymeric basic amino-nitrogen-containing material which may be used may vary, depending on compatibilities and effects desired, from 0.1% to 50%, based on the weight of the organic halogen-containing material. In most cases, however, the amount falls in the range of from 0.5% to 20%.

The basic amino-nitrogen-containing polymer may be incorporated with the organic halogen-containing substance in any suitable manner, for example, by solution with the organic halogen-containing material in a mutual solvent, by melting it with the organic halogen-containing material, or by milling, rolling, grinding, pressing or the like with the organic halogen-containing material.

As it has been mentioned above, it is preferable to use a basic amino-nitrogen-containing polymer which is compatible with the organic halogen-containing material. This is particularly true where transparency is desired in the finished composition. However, where transparency is not essential, other basic amino-nitrogen-containing polymers may be used. Mixtures of basic amino-nitrogen-containing polymers may also be used. Carboxylic acid addition salts of the amino-nitrogen-containing polymer, e. g., the acetates, lactates, and stearates, may be employed.

The two classes of basic amino-nitrogen-containing polymers which have given most satisfactory results in the present invention are the polymeric amino alcohol esters of alpha-substituted acrylic acids described in Harmon Serial No. 21,810 and Graves Serial No. 21,807 (both filed May 16, 1935), and the resins obtained by reacting phenols, formaldehyde, and amines, particularly the dilute acetic acid-soluble resins described in Harmon and Meigs Serial No. 85,820, filed June 17, 1936. The latter are obtained by reacting a phenol containing carbon, hydrogen, and oxygen only, and having at least two unsubstituted nuclear positions ortho or para to phenolic hydroxyl, with formaldehyde and a non-aromatic primary amine containing less than seven carbon atoms, the molecular ratio of amine to phenol being not less than 0.5:1 and not greater than 1:1, and the molecular ratio of aldehyde to amine being greater than 1:1.

Among other types of basic amino-nitrogen-containing polymers suitable for use in this invention may be mentioned the resinous products prepared by treating polyvinyl chloroacetate with secondary aliphatic amines; resins prepared by reacting aliphatic or alicyclic ketones with formaldehyde and primary or secondary aliphatic amines; resinous products resulting from the reaction between diphenyl- or other diarylguanidines with formaldehyde, or with formaldehyde and primary or secondary amines; resins prepared by reacting urea, formaldehyde, and lower primary or secondary aliphatic amines such as methyl-, dimethyl-, butyl-, and dibutyl-amines; reaction products of epichlorohydrin with ammonia or primary aliphatic amines, which reaction products have been polymerized in the presence of catalytic proportions of stannic chloride; and the reaction product of phenol-lignin with dimethylamine and formaldehyde.

There may also be employed in the practice of the invention the basic amino-nitrogen-containing polymers prepared by the reaction of polymeric vinyl ketones with ammonia or primary amines, for example, those described in Balthis Serial No. 69,725, filed March 19, 1936; the products obtained by catalytic hydrogenation of resins having ketone groups at superatmospheric temperature and pressure and in the presence of ammonia or primary or secondary amines such as those described in Greenewalt U. S. P. 2,063,158; reaction products of proteins, lower aliphatic aldehydes or ketones, and amines having less than 9 carbon atoms in which the amino nitrogen is joined to the aliphatic carbon, for example, those disclosed in Meigs Serial No. 59,643, filed January 17, 1936; and the reaction products of triethanolamine with polycarboxylic acids.

Additional examples of specific basic amino-nitrogen-containing polymers which function in this invention are beta-di-n-butylaminoethyl alpha-methacrylate polymer; 2-aminocyclohexyl alpha-methacrylate polymer; triethanolamine mono-methacrylate polymer; 2-(diethylamino)-cyclohexyl methacrylate polymer; 4-($\beta$-methacrylyloxyethyl)morpholine polymer; beta-dimethylaminoethyl alpha-methacrylate polymer; beta-diethylaminoethyl acrylate polymer; beta-dicyclohexylaminoethyl acrylate polymer; 1-($\beta$-methacrylyloxyethyl)piperidine polymer; the resin obtained by the hydrogenation, in the presence of ammonia, of polymerized bis-(4-ketocyclohexyl)dimethylmethane; the resin obtained from the hydrogenation, in the presence of ammonia, of polymerized methylvinyl ketone; the reaction product of polymeric methyl alpha-methylvinyl ketone and cyclohexylamine; the reaction products of polymeric methylvinyl ketone and aqueous ammonia (or cyclohexylamine, ethylenediamine, hexamethylenediamine, and the like); dibutylaminomethylzein; cyclohexylethyl-aminomethylzein; the reaction product of polyvinyl chloroacetate and dibutylamine; the resin obtained by reacting cyclohexanone with formaldehyde and methylamine; and the resinous reaction product of acetone with formaldehyde and butylamine.

The organic halogen-containing materials with which the organic-solvent-soluble, basic, amino-nitrogen-containing polymer is compounded may be any such materials which are substantially nonvolatile and subject to deterioration by light, heat, etc., tending to become brittle, discolored, unstable or otherwise deteriorated. Thus they include chlorinated rubbers prepared by the methods known to the art and containing from 35 to 75% and preferably from 50 to 70% chlorine; polymers of 2-chlorobutadiene and chlorinated polymers of 2-chlorobutadiene; synthetic resins containing chlorine such as polymers and interpolymers of vinyl chloride, polymers and interpolymers of vinyl chloroacetate; chlorinated polyvinyl chloride or polyvinyl acetate or metastyrene, chlorinated polymeric esters of acrylic and alpha-substituted acrylic acids, chlorinated phenol-formaldehyde resins, chlorinated ether resins (for example, the chlorine-containing ether resins disclosed in Arvin U. S. P. 2,060,715), and chlorinated dihydronaphthalene resin; chlorine-containing rubbers or rubber derivatives, such as chlorinated rubber, chlorinated isomerized rubber, and chlorinated rubber hydrochloride; halogenated or halogen-containing waxes such as chlorinated paraffins, chlorinated naphthalenes, and chlorinated diphenyls; and chlorine-containing plasticizers such as alpha-chloronaphthalene, beta-phenoxyethyl chloride, beta-phenoxyethoxyethyl chloride, and polyhydric alcohol esters of chloroacetic, chlorobutyric, and bromostearic acids.

Depending upon the use to which they are to be put, the compositions which may be prepared by the practice of this invention may contain, in addition to the organic halogen-containing material and the basic amino-nitrogen-containing polymer, various other added materials. Among these may be mentioned solvents, drying oils, driers, pigments, dyes, waxes, synthetic or naturally occurring resins, blending agents of various types, plasticizers, fillers, and the like. Depending on the formulation chosen, the compositions are suitable for use as varnishes, lacquers, paints, and for the preparation of coatings, films, transparent sheets, filaments, plastics, adhesives, and the like. The compositions prepared according to the practices of this invention may be used for coating cloth, fabric, paper, cardboard, leather, wood, metals, stone, and the like and may be laminated in sheet form to these materials.

When compared with compositions of the prior art, the compositions which are an object of this invention are considerably more resistant to the deteriorating effects of light and heat. Also, as already pointed out, they have when laid out in films a greater water-resistance than similar compositions containing low molecular weight organic bases. In addition, because of the non-volatility of the basic amino-nitrogen-containing polymers, these new compositions retain their resistance to heat over longer periods of time than do similar compositions containing low molecular weight organic bases. Because of the excellent solubility characteristics of the basic amino-nitrogen-containing polymers, these new compositions are much more readily prepared than those of the prior art employing metallic salts. In addition, transparent compositions can readily be prepared by the practice of the present invention because of the high degree of compatibility of the basic amino-nitrogen-containing polymers with the organic halogen-containing compounds with which they are used. Another advantage of these new compositions is that they have substantially the same or a greater film-forming ability than the unmodified halogen-containing coating composition due to the inherent film-forming properties of the basic amino-nitrogen-containing polymers. This point is particularly important when the compositions are used for the preparation of coatings, sheets, filaments, plastics, and the like.

The above description and examples are intended to be illustrative only. Any modification of or variation therefrom which conforms to the spirit of the invention is intended to be included within the scope of the claims.

We claim:

1. A plastic or coating composition comprising a substantially non-volatile, chlorine-containing resin subject to deterioration on exposure to heat or light and, as a preventive of such deterioration, a non-volatile, film-forming, polymeric, basic amino-nitrogen-containing, chlorine free substance soluble in organic solvents.

2. A plastic or coating comprising substantially non-voltile, chlorinated rubber subject to deterioration on exposure to heat or light and, as a preventive of such deterioration, a non-volatile, film-forming, polymeric, basic amino-nitrogen-containing, chlorine free substance soluble in organic solvents.

3. A plastic or coating composition comprising a substantially non-volatile, chlorine containing, vinyl resin subject to deterioration on exposure to heat or light and, as a preventive, of such deterioration, a non-volatile, film-forming, polymeric basic amino-nitrogen-containing, chlorine-free substance soluble in organic solvents.

4. A plastic or coating composition comprising a substantially non-volatile, chlorine containing plasticizer subject to deterioration on exposure to heat or light and, as a preventive of such deterioration, a non-volatile, film-forming, polymeric, basic amino-nitrogen-containing, chlorine-free substance soluble in organic solvents.

5. A plastic or coating composition comprising a substantially non-volatile, chlorine containing resin subject to deterioration on exposure to light or heat and, as a preventive of such deterioration, a non-volatile, film-forming, polymeric, chlorine-free, organic-solvent-soluble amino alcohol ester of an alpha substituted acrylic acid.

6. A plastic or coating composition comprising substantially non-volatile, chlorinated rubber subject to deterioration on exposure to light or heat and, as a preventive of such deterioration a non-volatile, film-forming, polymeric, chlorine-free, organic-solvent-soluble, basic amino-nitrogen containing resinous reaction product of a phenol, formaldehyde and a non-aromatic primary amine.

7. A plastic or coating composition comprising a substantially non-volatile, chlorine containing vinyl resin subject to deterioration on exposure to light or heat and, as a preventive of such deterioration a non-volatile, film-forming, polymeric, chlorine free, organic-solvent-soluble amino alcohol ester of an alpha substituted acrylic acid.

8. A plastic or coating composition comprising a substantially non-volatile chlorine containing plasticizer subject to deterioration on exposure to light or heat and, as a preventive of such deterioration a non-volatile, film forming, polymeric, chlorine free, organic-solvent-soluble reaction product of a protein, an amine having less than nine carbon atoms and a lower aliphatic carbonyl compound of the class consisting of aldehydes and ketones.

9. A plastic or coating composition containing a substantially non-volatile, organic, halogen-containing substance subject to deterioration on exposure to heat or light and, as a preventive of such deterioration, a non-volatile, film-forming, polymeric, organic, halogen-free, basic amino-nitrogen containing substance soluble in organic solvents.

10. A composition of matter comprising a substantially non-volatile, organic, chlorine-containing substance subject to deterioration on exposure to heat or light and, as a preventive of such deterioration, a non-volatile, film-forming, polymeric, organic-solvent-soluble, basic amino-nitrogen containing, resinous reaction product of a phenol, formaldehyde and a non-aromatic primary amine.

ELLSWORTH K. ELLINGBOE.
PAUL L. SALZBERG.

CERTIFICATE OF CORRECTION.

Patent No. 2,190,776. February 20, 1940.

ELLSWORTH K. ELLINGBOE, ET AL.

It is hereby certified that error appears in the printed specification of the above numbered patent requiring correction as follows: Page 5, first column, line 66, claim 2, after the word "coating" insert --composition--; line 67, same claim, for "non-voltile" read --non-volatile--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.